J. E. WARDER.
TIRE SHOE.
APPLICATION FILED OCT. 11, 1917.
1,292,176.
Patented Jan. 21, 1919.
3 SHEETS—SHEET 3.
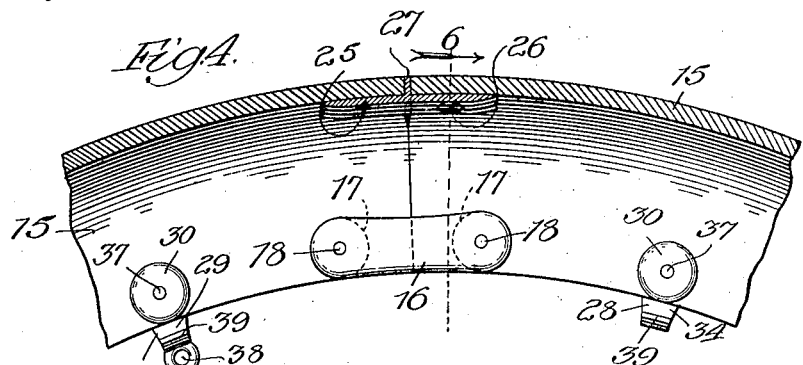
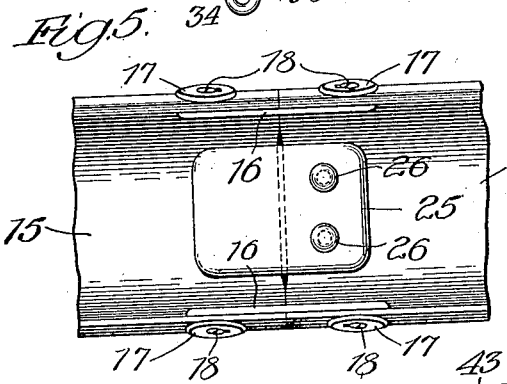
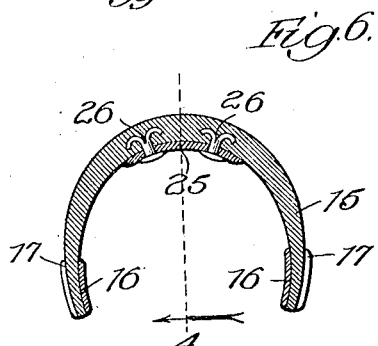
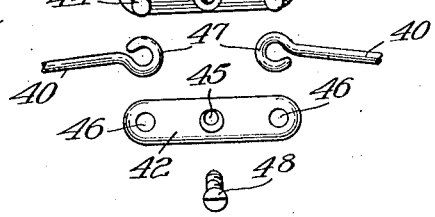
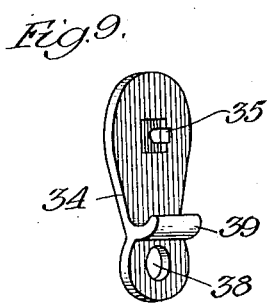
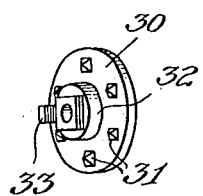
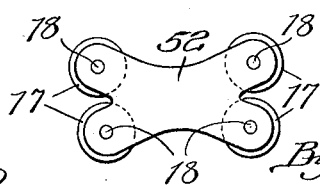
Witnesses:
Inventor:
James E. Warder,
By Dyrenforth, Lee, Chritton & Wiles,
Attys.

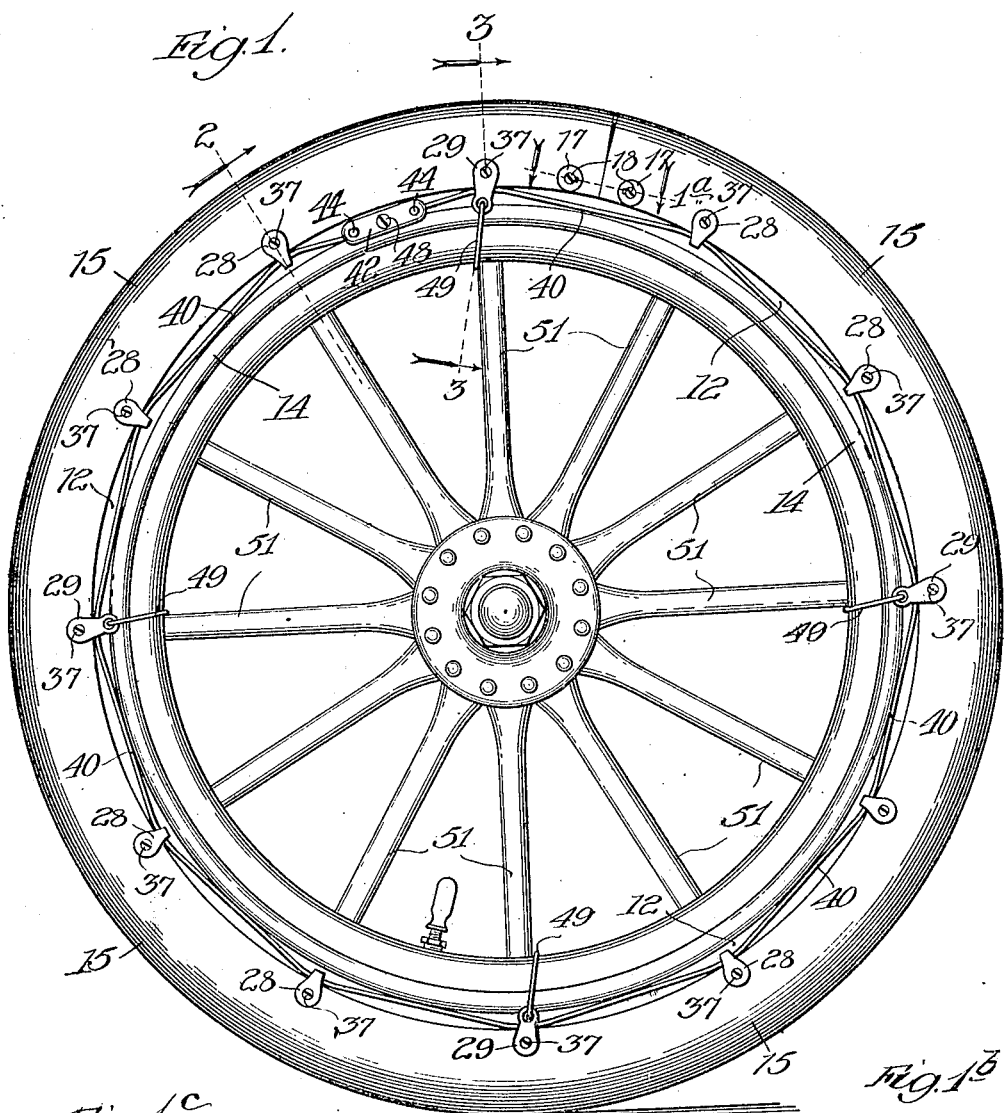
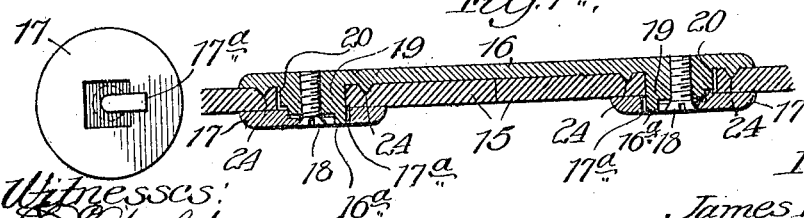
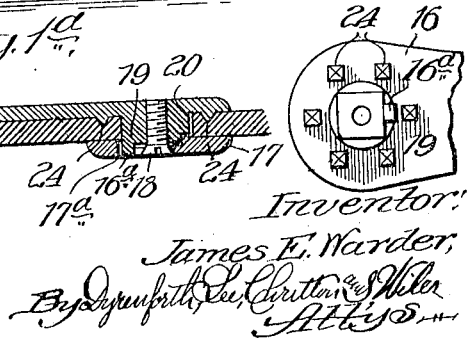

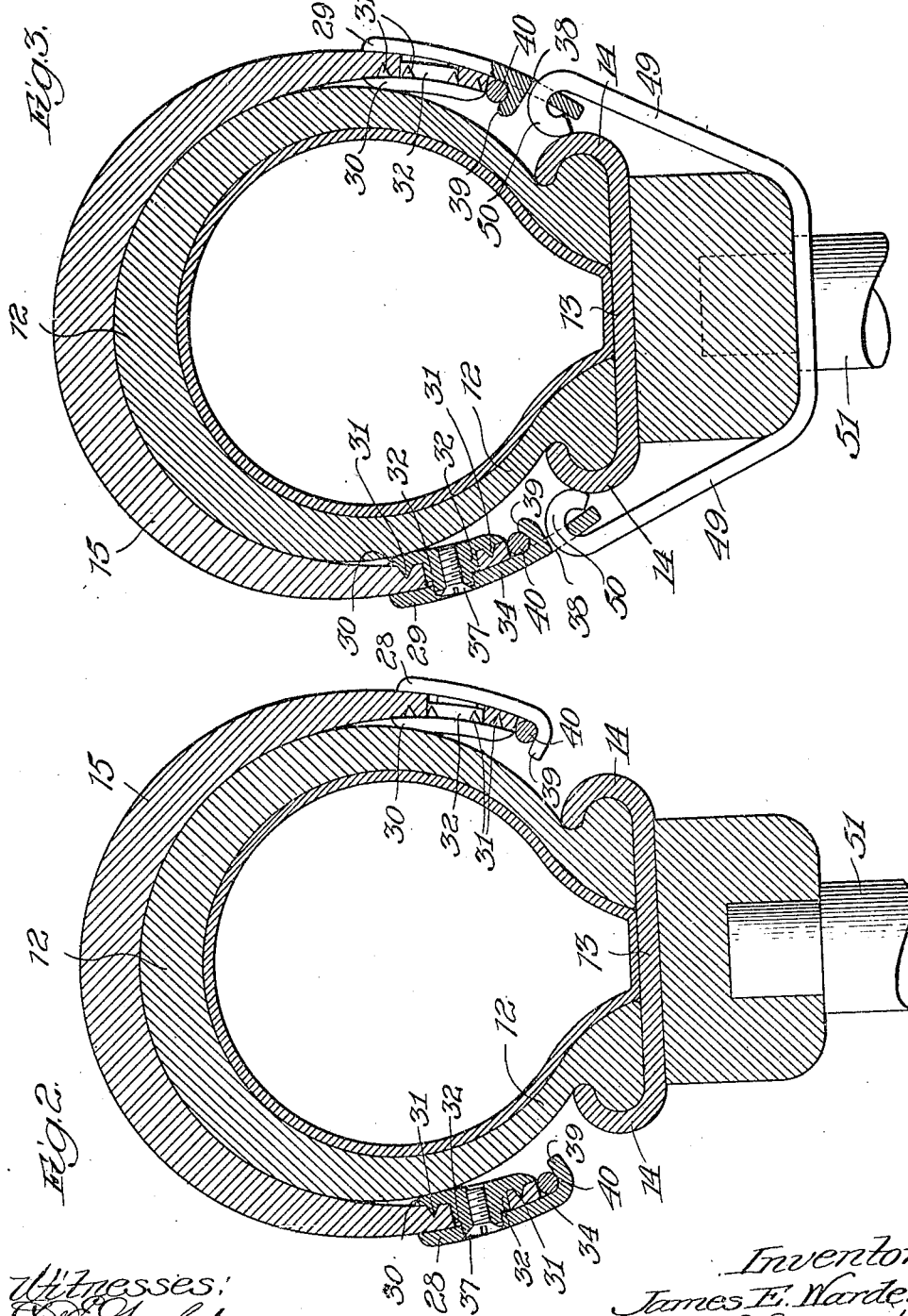

UNITED STATES PATENT OFFICE.

JAMES E. WARDER, OF CHICAGO, ILLINOIS.

TIRE-SHOE.

1,292,176.　　　　Specification of Letters Patent.　　Patented Jan. 21, 1919.

Application filed October 11, 1917. Serial No. 195,896.

*To all whom it may concern:*

Be it known that I, JAMES E. WARDER, a citizen of the United States, residing at Chicago, in the county of Cook and State of Illinois, have invented a new and useful Improvement in Tire-Shoes, of which the following is a specification.

My invention relates to the use of partially impaired outer casings of pneumatic tires, such as those which have been impaired from "blow-outs," as supplemental coverings or "shoes" for the tires of vehicles, the tire-shoes thus provided, and which often times are so slightly worn that they are still capable of giving thousands of miles of service, serving as a protecting covering for the tires on the vehicle.

My invention relates more particularly to the fastening of the shoe to the tire, and my primary objects are to provide novel and simple fastening means for this purpose which may be readily applied to operative position for properly securing the shoe in place and preferably readily removed when desired.

Referring to the accompanying drawings, Figure 1 is a side elevation of a tire-equipped wheel with my improvement applied thereto. Fig. 1ª is an enlarged section taken on the line 1ª on Fig. 1 and viewed in the direction of the arrow. Fig. 1ᵇ is a face view of one of the similar ends of the plate forming a part of the structure in Fig. 1ª. Fig. 1ᶜ is a face view of the button member of this structure. Fig. 2 is an enlarged section taken at the line 2 on Fig. 1 and viewed in the direction of the arrow. Fig. 3 is a similar section taken at the irregular line 3—3 on Fig. 1 and viewed in the direction of the arrow. Fig. 4 is a broken longitudinal section through the shoe device at the portion thereof where its ends are joined together, the section being taken at the line 4 on Fig. 6 and viewed in the direction of the arrow. Fig. 5 is a bottom plan view of the structure shown in Fig. 4. Fig. 6 is a section taken at the line 6 on Fig. 4 and viewed in the direction of the arrow. Fig. 7 is a view of the means for securing the ends of tensioning wires engaging the free edges of the shoe, the elements forming these means being shown in disassembled, but related, position. Fig. 8 is a plan section of the means shown in Fig. 7, showing the latter in assembled position. Fig. 9 is a perspective view of one of the elements of a form of clip means employed. Fig. 10 is a similar view of another element of these clip means; and Fig. 11, a plan view of a modification of the plate shown in the preceding figures for connecting the ends of the shoe.

The ordinary pneumatic tire, as commonly used on vehicles, is represented at 12, being held in place on the rim 13 of the wheel by the clencher-flanges 14. The tire-shoe is represented at 15, this shoe, as above stated, being a wear resisting member, as for example a partially impaired outer casing of a tire which has its impaired portion cut away and is cut down to fit about the tire 12. In the case illustrated, the beads at the inner edges of the outer casing forming the shoe 15, are cut away, but the invention as to certain features thereof, contemplates the retaining of the beads on the casing if desired. The shoe 15 overlaps the tire 12, as illustrated in Figs. 2 and 3 and its abutting ends are connected together, in accordance with the showing in Figs. 1 to 5 inclusive by clip-devices comprising plates 16 located at opposite sides of the shoe at its inner surface and spanning the joint between the ends of the member forming the shoe, disks 17 in the form of buttons, applied to the outer surfaces of the shoe, and screw devices 18 connecting the buttons 17 with the plates 16. Each plate 16 preferably is provided at opposite ends with circular bosses 19, which extend into openings 20 previously formed in the ends of the shoe. The screws 18 pass through the buttons 17 and screw into plate 16 at its boss-equipped portions, for rigidly holding the buttons to the plate, and the surfaces of the plate 16, which bear against the shoe, have, by preference, prongs 24 which become embedded in the fabric of the shoe and enhance the holding effect. To prevent the buttons 17 from working the screws 18 loose under the action of the tire, these buttons are prevented from turning by the engagement of lugs 16ª on the bosses 19 with the walls of slots 17ª in the buttons 17 into which they extend.

By preference, the shoe is provided at the inner surface of its peripheral portion, with a plate 25 secured at one end, as by the rivets 26, to one end of the tire-shoe and overlapping at its opposite end the joint formed between the abutting ends of the shoe, this plate being preferably provided with a rib 27 extending into the joint between the ends of the shoe for insuring support for the raw edges of the ends of the shoe.

Under certain conditions, it is desirable that retaining wires or similar devices be provided at the inner edges of the shoe 15. In accordance with the preferred illustrated embodiment of the invention, I provide retaining means of this character about the shoe 15, these means comprising a series of other clip-devices secured to the inner free edges of the tire-shoe at intervals about the latter, and retaining wires engaging these clip-devices. The clip-devices just referred to are represented at 28 and 29, the clips 29, which are provided also for engagement with means hereinafter described for preventing creeping of the tire-shoe about the tire, being each formed of a disk 30 adapted to fit at its pronged surface 31 against the inner surface of the tire-shoe and project at a boss 32 thereon through an opening in the tire-shoe; a plate, or button, 34 adapted to be applied against the outer face of the shoe; and a screw 37 which passes through the button 34 and screws into the boss 32 for holding these parts together in clamped position on the tire-shoe, the inner portions of the plates 34 being provided at their extremities with eyes 38 and intermediate their ends, with grooved seats 39 in which the retaining wires represented at 40, seat. To insure against accidental working loose of the screws 37, lugs 33 provided on the bosses 32 are positioned to extend into recesses 35 in the buttons 34 and engage with the walls thereof. The clip-devices 28 are the same as 29 excepting that the eye-equipped portions 38 thereof are omitted. The retaining wires 40 thus lie within the seats 39 disposed at intervals about the circumference of the wheel and are secured at their adjacent ends in any desirable manner to render them relatively taut, but preferably by the means shown in Figs. 7 and 8 which comprise a pair of plates 41 and 42, the plate 41 having an internally-threaded boss 43 and lugs 44 at opposite sides of the latter, and the plate 42 having a central opening 45 registering with the opening in the boss 43 and end openings 46 registering with the lugs 44 into which the latter are adapted to extend. The ends of the retaining wires are bent into eyes, as represented at 47, and are inserted over the lugs 44 when the tire is in deflated condition, and are held in place thereon by assembling the plates 41 and 42 and securing them together as by a screw 48.

It will be readily understood from the foregoing description and drawings that the operation of applying the tire-shoe to a tire or removing it therefrom, is a comparatively simple operation, as the fastening means are capable of easy operation and the minimum number are employed.

In the particular construction illustrated, the means for preventing creeping of the shoe on the tire are in the form of wires 49, which are looped about the rim 13 and engage at their hook-ends 50 with the eyes 38, relative movement of the tire and shoe, one about the other, being prevented by the engagement of the wires 49 with the adjacent spokes 51 of the wheel.

Where the tire-shoe is relatively large, it is preferred that the clamping means 16 engage a larger surface of the tire than in the case of the construction shown in Fig. 1. A modification of these means for this purpose is shown in Fig. 11, this construction being the same as the clamping means 16 excepting that the plate member represented at 52 and corresponding with the plate 16 has four points of attachment for buttons 17, which would be provided four in number instead of two.

While I have shown the various features of my invention assembled in a single structure, it will be understood that they need not be so employed, nor do I wish to be understood as intending to limit my invention to the particular construction shown, as the same may be variously modified and altered without departing from the spirit of my invention.

What I claim as new and desire to secure by Letters Patent is—

1. The combination with a tire-shoe formed of a non-continuous member adapted to encircle a tire on a wheel with its ends closely adjacent to each other, of means connecting together the ends of said member comprising rigid plates spanning the joint between the ends of said member at the inner surface of the latter at its opposite sides, and means securing the ends of said plates to the ends of said member, said means including a button adjacent one end of said plate and opposing the outer side of the shoe, a boss located between said plate and button and extending through a wall of said shoe, a screw for securing said button and plate together and passing through said boss, and means for preventing rotation of said button relative to said plate.

2. The combination with a tire-shoe formed of a non-continuous member adapted to encircle a tire on a wheel with its ends closely adjacent to each other, of means for connecting together the ends of said member, and a bridge-plate carried by said member on its interior surface at its tread portion and adapted to span said joint when said shoe is applied to a tire, and a rib on said plate extending into said joint.

JAMES E. WARDER.